(12) United States Patent
Takeuchi et al.

(10) Patent No.: US 8,496,791 B2
(45) Date of Patent: Jul. 30, 2013

(54) ACTIVE OXYGEN GENERATING APPARATUS

(75) Inventors: Shiro Takeuchi, Chiyoda-ku (JP); Mari Saito, Chiyoda-ku (JP); Takuya Furuhashi, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 399 days.

(21) Appl. No.: 13/059,668

(22) PCT Filed: Apr. 15, 2009

(86) PCT No.: PCT/JP2009/057594
§ 371 (c)(1),
(2), (4) Date: Feb. 18, 2011

(87) PCT Pub. No.: WO2010/119529
PCT Pub. Date: Oct. 21, 2010

(65) Prior Publication Data
US 2011/0147201 A1    Jun. 23, 2011

(51) Int. Cl.
*C25B 9/00* (2006.01)
(52) U.S. Cl.
USPC ........ 204/242; 204/275.1; 204/660; 205/464; 205/465; 205/742
(58) Field of Classification Search
USPC .......................................................... 204/242
See application file for complete search history.

(56) References Cited

U.S. PATENT DOCUMENTS 5,741,887 A * 4/1998 Morita et al. ............... 528/422

FOREIGN PATENT DOCUMENTS

| JP | 10-316403 | A | | 12/1998 |
| JP | 11-079708 | A | | 3/1999 |
| JP | 11079708 | A | * | 3/1999 |
| JP | 11-158675 | A | | 6/1999 |
| JP | 3043981 | B2 | | 5/2000 |
| JP | 2002-273433 | A | | 9/2002 |
| JP | 2002273433 | A | * | 9/2002 |
| JP | 3419656 | B2 | | 6/2003 |
| JP | 3492327 | B2 | | 2/2004 |
| JP | 2006-299326 | A | | 11/2006 |

OTHER PUBLICATIONS

International Search Report (PCT/ISA/210) issued on Jul. 21, 2009, by Japanese Patent Office as the International Searching Authority for International Application No. PCT/JP2009/057594.
Written Opinion (PCT/ISA/237) issued on Jul. 21, 2009, by Japanese Patent Office as the International Searching Authority for International Application No. PCT/JP2009/057594.

(Continued)

*Primary Examiner* — Harry D Wilkins, III
*Assistant Examiner* — Bryan D. Ripa
(74) *Attorney, Agent, or Firm* — Buchanan Ingersoll & Rooney PC

(57) ABSTRACT

An active oxygen generating apparatus comprises cathodes constituted by a plurality of base materials, each containing a conductive polymer, an anode having conductivity, a power source that conducts electricity between both electrodes through water in which oxygen is dissolved, and a water receiving portion that contains the water. The cathodes are made of a plurality of plate-shaped base materials installed upright at intervals in the water receiving portion and the anode is arranged across the plurality of base materials and orthogonally to the plurality of base materials.

10 Claims, 3 Drawing Sheets

OTHER PUBLICATIONS

Office Action (Notification of the First Office Action) dated Sep. 12, 2012, issued in corresponding Chinese Patent Application No. 200980140328.0, and an English Translation thereof. (6 pages).

Office Action from Chinese Patent Office dated Apr. 2, 2013, issued in corresponding Chinese Patent Appln. No. 200980140328.0, with English translation thereof (7 pages).

* cited by examiner (a)　　　　　　　　　　　　　　(b)

US 8,496,791 B2

ACTIVE OXYGEN GENERATING APPARATUS

TECHNICAL FIELD

The present invention relates to an apparatus that efficiently and continuously generates active oxygen and particularly to a structure that can realize size reduction and simplification thereof.

BACKGROUND ART

As means for generating active oxygen, methods using discharge or a photocatalyst are available. However, the former needs a large amount of electricity, and safety measures need to be taken for high-voltage input. Also, the latter needs a light source for ultraviolet rays in order to exert its effect, whereby the size of an apparatus is increased, and the influence of the ultraviolet rays on the human body has to be considered. Also, there is means for generating active oxygen by electrolysis using electricity in water, but large amounts of undesired hydrogen and chlorine are generated as by-products. As means to solve such problems, such means for significantly generating active oxygen by conducting a weak electric current between an anode and a cathode supporting a conductive polymer having an oxygen generating capacity (hereinafter referred to as a conductive polymer) so as to suppress generation of hydrogen and chlorine is known (See Patent Literature 1, for example)

CITATION LIST

Patent Literature

PTL 1: Japanese Patent No. 3492327 (FIG. 1 and the like)

SUMMARY OF INVENTION

Technical Problem

The conductive polymer is excellent in oxidation-reduction reactivity, and an electron is provided from the conductive polymer to dissolved oxygen in the water, the oxygen being reduced so as to generate active oxygen. By electrically providing reduction potential to polyaniline having such oxidation-reduction capacity and continuously supplying electrons, active oxygen is continuously generated in the water. In such a method, in order to improve the efficiency of the amount of active oxygen generated, such an apparatus is known in which electrode pairs are stacked and a plurality of cathodes supporting the conductive polymer are arranged opposite an anode. However, since the distance between the stacked cathodes and the anode gradually increases, the larger the distance from the anode is, the smaller the amount of active oxygen generated becomes, and the cathode contributing to the generation is the cathode substantially adjacent to the anode.

The present invention was made in view of the above problems and has an object to obtain an active oxygen generating apparatus that can efficiently and continuously generate active oxygen while size reduction or simplification of the active oxygen generating apparatus is realized.

Solution to Problem

The active oxygen generating apparatus of the present invention comprises cathodes constituted by a plurality of base materials each containing a conductive polymer, an anode having conductivity, a power source that conducts electricity between the cathodes and the anode through water in which oxygen is dissolved, and a water receiving portion that contains the water. The cathodes are made of a plurality of plate-shaped base materials installed upright at intervals in the water receiving portion and the anode is arranged across the plurality of base materials and orthogonally to the plurality of base materials.

Also, the surface area of the anode dipped in the water is set to be substantially equal to or smaller than the surface area of the cathodes dipped in the water.

Advantageous Effects of Invention

According to the active oxygen generating apparatus of the present invention as above, since a common anode can be used for a plurality of base materials (cathodes), the configuration of the electrode can be made compact and simplified and moreover, an active oxygen amount can be increased.

Also, by setting the surface area of the anode dipped in the water to be substantially equal to or smaller than the surface area of the cathodes dipped in the water, consumption in the anode of active oxygen generated at the cathode is reduced and as a result, the active oxygen amount can be increased.

DESCRIPTION OF EMBODIMENTS

Embodiments of an active oxygen generating apparatus according to the present invention will be described below. The active oxygen generating apparatuses in Embodiments have a common point in that a cathode 4 composed of a base material containing a conductive polymer and an anode 5 having conductivity are dipped in water 1 in which oxygen is dissolved and electricity is conducted between the cathode 4 and the anode 5 so as to generate active oxygen.

Embodiment 1

Figure 1:
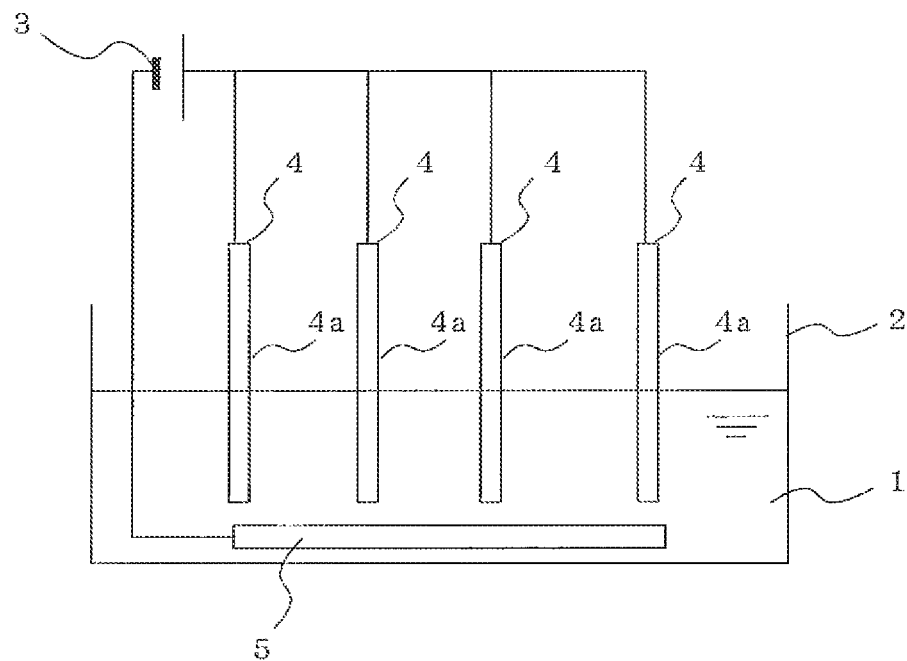
FIG. 1 is schematic sectional view of an active oxygen generating apparatus in Embodiment 1 of the present invention.

FIG. 1 is a schematic sectional view illustrating a configuration of an active oxygen generating apparatus according to Embodiment 1 of the present invention. This active oxygen generating apparatus is provided with the cathode 4 composed of a plate-shaped base material 4*a* containing a conductive polymer, the anode 5 having conductivity, a power source 3 that conducts electricity between both electrodes 4 and 5 through the water 1 in which oxygen is dissolved, and a water receiving portion 2 that contains the water 1. Then, by conducting electricity from the power source 3 between the cathodes 4 and the anode 5 through the water 1 contained in the water receiving portion 2, active oxygen is generated.

The cathodes 4 are constituted by a plurality of the base materials 4a, each being formed in a plate shape (disk shape, square plate shape and the like), and a single plate-shaped anode 5 is arranged at a bottom portion of the water receiving portion 2 across the plurality of base materials 4a so as to be orthogonal to each plate-face direction of the plurality of base materials 4a. That is, the common anode 5 is disposed in a mode to be orthogonal to the plurality of base materials 4a, which are the cathodes 4.

Also, the surface area of the anode 5 dipped in the water 1 contained in the water receiving portion 2 is set to be substantially equal to or smaller than the surface area of the cathodes 4 dipped in the water 1 (a value obtained by adding up the surface areas of all the base materials 4a constituting the cathodes 4 dipped in the water 1). In this way, the amount of substances generated at the anode 5 is decreased, reaction and consumption of the active oxygen generated at the cathode with a substance generated on the anode side are reduced, and as a result, the amount of the active oxygen generated in this apparatus can be increased.

Also, in the configuration in FIG. 1, the distance between the plurality of the base materials 4a (the cathodes 4) is preferably larger than the distance between the anode 5 and each of the base materials 4a (cathodes 4). That is because if the former distance is smaller than the latter distance, a current amount supplied into the water is decreased and electron distribution is not uniform any more, whereby the amount of active oxygen generated is reduced.

The base materials 4a constituting the cathodes 4 contain the conductive polymer. Each of the base materials 4a can be formed from a conductive material such as carbon, platinum-supported titanium, a conductive resin and the like and also from insulating materials such as PET (polyethylene terephthalate), ABS resin, PP (polypropylene) and the like. Alternatively, the base material 4a itself may be a conductive polymer. The conductive polymer is made of at least one of materials of polyaniline, polyaniline derivative, polypyrrole, polythiophene, and polyacetylene, for example.

The base material constituting the anode 5 can be formed from either one or more of carbon, platinum-supported titanium, and a conductive resin, and its surface resistance value is preferably set in the range of $10^{-3}$ to $10^5$ $\Omega$/cm.

If the surface resistance value is low, the current can easily flow, and reaction between both electrodes is promoted. If the surface resistance value is $10^5$ $\Omega$/cm or more, the conducted electric current becomes several tens of $\mu$A at maximum, which is a level at which the amount of active oxygen generated is negligibly detected.

According to the above active oxygen generating apparatus, electrons are provided to the oxygen dissolved in the water 1 from the conductive polymer contained on the surfaces of the cathodes 4, and active oxygen such as superoxide, hydroxyl radical, hydrogen peroxide and the like is generated. On the other hand, although the electrons in the water are removed from the surface of the anode 4 and oxygen is generated, reaction with other mixed-in impurities causes hypochlorous acid generated, for example, is generated. Since active oxygen reacts with hypochlorous acid and returns to the water, if many substances generated at the anode 5, the amount of active oxygen present in the water is decreased. Thus, a diaphragm is installed between the anode 5 and the cathodes 4 so as to separate the substances generated at each electrode in general. However, in the present invention, the diaphragm is not used, but by setting the area (surface area) of the anode 5 dipped in the water so as to be substantially equal to or smaller than the area (surface area) of the cathodes 4 dipped in the water, reduction of the amount of active oxygen is suppressed.

Figure 2:
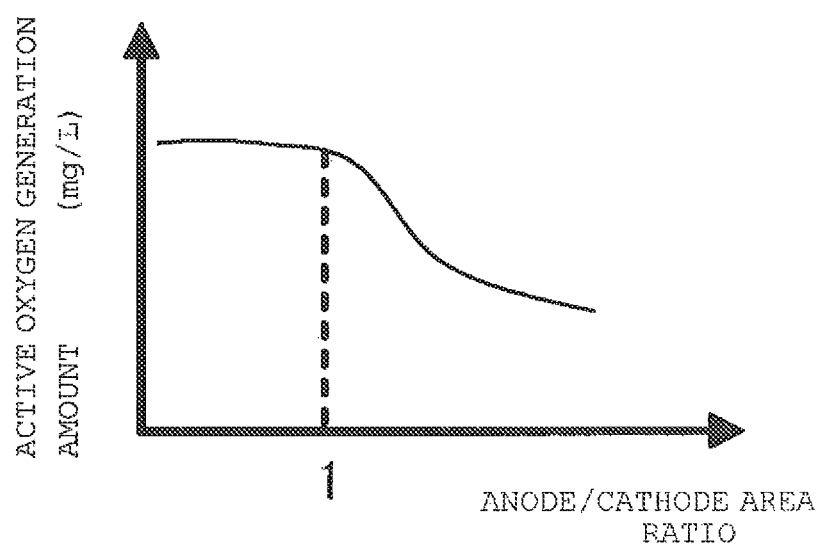
FIG. 2 is a graph illustrating the relationship between the amount of active oxygen generated and the ratio of the surface area of anode to the surface area of cathode in Embodiment 1.

Subsequently, the relationship between the surface area of the anode 5 to the surface area of the cathodes 4 and the amount of active oxygen generated is shown. FIG. 2 shows the amount of hydrogen peroxide generated after 6 hours have elapsed since the anode 5 made of carbon and the cathodes 4 composed of a plurality of base materials supporting polyaniline in carbon cloth are used, the surface area of the cathodes 4 is fixed to 51 $cm^2$, while the surface area of the anode 5 is changed and 1.4V vs AgCl is applied. The "1.4V vs AgCl" means that a silver chloride (AgCl) electrode is used as a reference electrode, the electrode potential of either of the electrodes (an anode, for example) is set at 0, and 1.4V is applied.

The distance between the electrodes (the distance between the cathodes 4 and the anode 5) at this time is 5 mm, and measurement was made using tap water for the water 1. From FIG. 2, it is known that if the surface area of the anode 5 is larger than that of the cathodes 4, the amount of active oxygen is decreased. Since the active oxygen generated at the cathodes 4 is extinguished upon contact with the anode 5, if the surface area of the anode 5 is larger than that of the cathodes 4, the amount of active oxygen generated at the cathodes 4 extinguished by the anode 5 is increased, and as a result, the active oxygen amount in the water 1 is reduced. Also, even if the surface area of the cathodes 4 is larger than the surface area of the anode 5, no marked change is found in the amount of active oxygen generated from the cathodes 4. Therefore, in order to increase the amount of active oxygen generated, the surface area of the anode 5 dipped in the water is preferably set to be equal to or smaller than the surface area of the cathodes 4 dipped in the water. On the other hand, if the surface area of the anode 5 is made smaller than that of the cathodes 4, the amount of active oxygen generated is decreased in accordance with the surface area of the cathodes 4. Thus, by setting the surface area of the anode 5 dipped in the water to be substantially equal to the surface area of the cathodes 4 dipped in the water, the space efficiency becomes the highest, an apparatus with a larger amount of active oxygen generated than an apparatus with a similar size, for example, can be obtained, and an apparatus with a smaller size than the apparatus with the similar amount of active oxygen generated can be obtained. Considering the generation efficiency of the active oxygen, the distance between the cathodes 4 and the anode 5 is preferably 10 cm at most.

According to the active oxygen generating apparatus in Embodiment 1, since the common anode 5 can be used for the plurality of base materials 4a (cathodes 4), the configuration of the electrodes 4 and 5 can be made compact and simplified. In addition, since the area of the cathodes 4 of the active oxygen generation portion can be made larger, the amount of active oxygen generated can be increased.

Moreover, by setting the surface area of the anode dipped in the water substantially to be equal to or smaller than the surface area of the cathodes dipped in the water, consumption by the anode of the active oxygen generated at the cathodes is reduced, and as a result, the active oxygen amount can be increased, and size reduction of the active oxygen generating apparatus can be achieved.

Embodiment 2

Figure 3:
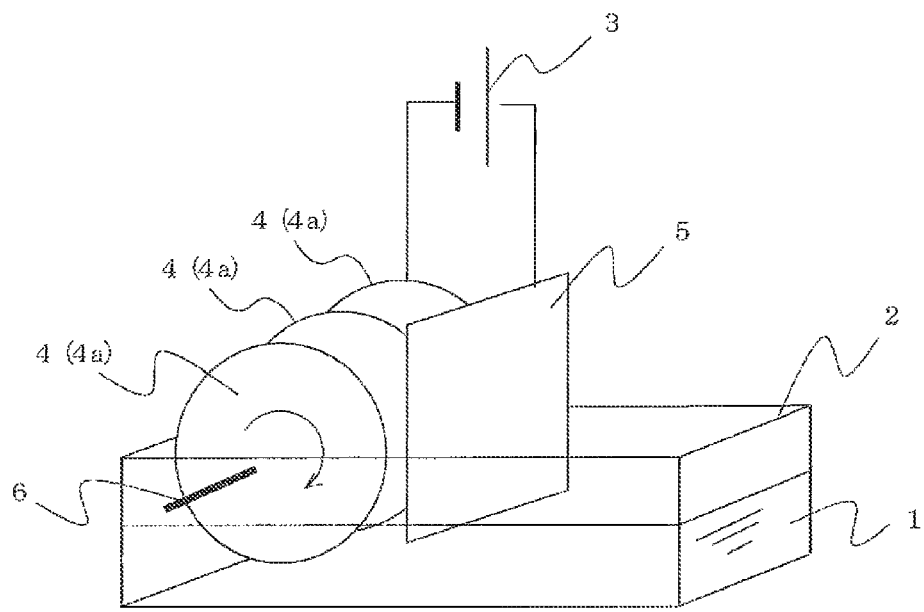
FIG. 3 is a schematic configuration diagram of an active oxygen generating apparatus in Embodiment 2 of the present invention.

Subsequently, Embodiment 2 of the present invention will be described. FIG. 3 is a schematic diagram illustrating a configuration of an active oxygen generating apparatus according to Embodiment 2 of the present invention. Here, a conductive shaft 6 having its axial direction in the horizontal direction is rotatably arranged above the water receiving portion 2, and a plurality of the plate-shaped (preferably disk-shaped) base materials 4a are arranged on the shaft 6 at intervals so as to form the cathodes 4. These cathodes 4 are installed so that a part of each base material 4a is dipped in the water 1 collected in the water receiving portion 2 so as to realize a configuration in which a face of each base material 4a dipped in the water 1 is rotated with rotation of the shaft 6. By means of rotation of the cathodes 4, the surface of each base material 4a is brought into contact with the water 1 and the atmosphere alternately.

On the other hand, the plate-shaped anode 5 has its plane portion made parallel along the axial direction of the shaft 6 and arranged upright in the water receiving portion 2. That is, the common anode 5 is arranged across the plurality of base materials 4a and so as to be orthogonal to each plane-face direction of the plurality of base materials 4a.

The base material 4a constituting the cathode 4 contains the conductive polymer, and the base material may be a conductive material such as carbon, platinum-supported titanium, a conductive resin and the like and in addition, an insulating material such as PET, ABS, PP and the like may be used. Alternatively, the base material 4a itself may be a conductive polymer.

On the other hand, the anode 5 can be formed from one or more of base materials of carbon, platinum-supported titanium, and a conductive resin. Here, too, the surface area of the anode 5 dipped in the water is set to be equal to or smaller than the surface area of the cathodes 4 dipped in the water.

Figure 4:
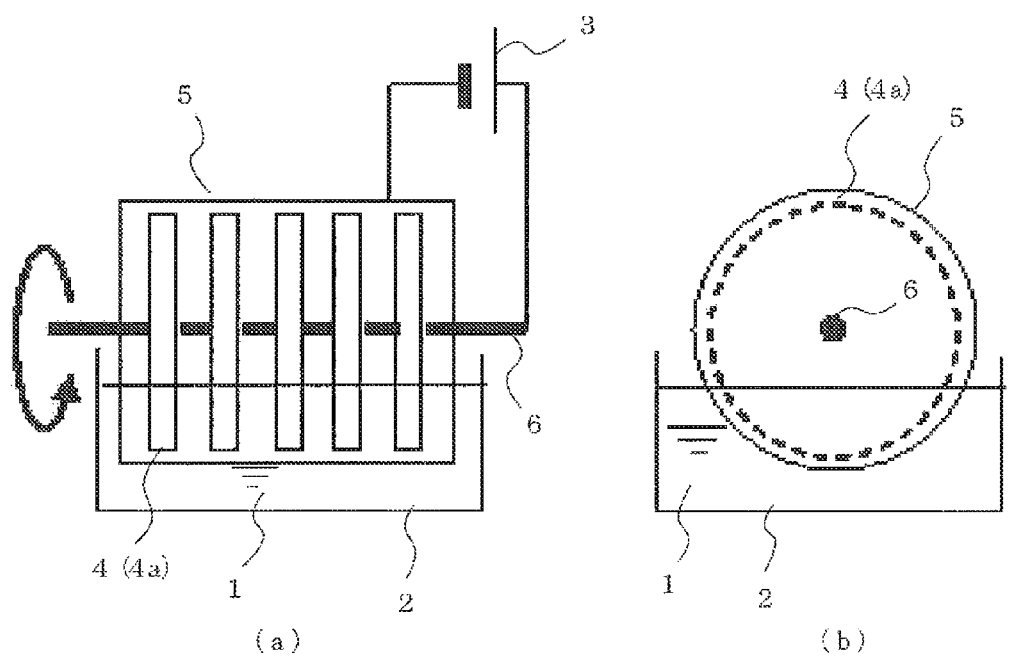
FIG. 4 are schematic sectional views of the active oxygen generating apparatus showing a variation of Embodiment 2.

FIG. 4 are schematic sectional views of the active oxygen generating apparatus illustrating another example of Embodiment 2, in which FIG. 4A is a front view and FIG. 4B is a side view. In FIG. 4, the configuration of the cathodes 4 is the same as in FIG. 3. On the other hand, the anode 5 is arranged by being formed in a cylindrical shape covering the periphery of the cathodes 4. However, in order that the cathodes 4 inside the anode 5 are also dipped in the water 1, water penetrating properties should be ensured by forming the anode 5 in a mesh state or by a porous material. The anode 5 may be formed only on the side face of the cylindrical shape and the other face opposite to the cathodes 4 may be constituted as a frame body in order to maintain the cylindrical shape. By forming an opening in the frame body so that the water flows into the cylindrical shape, the anode 5 can be formed only by rounding a plate-shaped material, which results in formation with a low cost.

According to the active oxygen generating apparatus of Embodiment 2, in addition to the effect in Embodiment 1, the surface of each base material 4a of the cathodes 4 is brought into contact with the water and the atmosphere alternately, whereby the efficiency of the amount of active oxygen generated on the surface of the base material 4a is improved.

Also, by providing a rotating mechanism, freedom in installation modes of the electrodes (the cathodes 4 and the anode 5) is increased, whereby the size of the active oxygen generating apparatus can be reduced.

Embodiment 3

Figure 5:
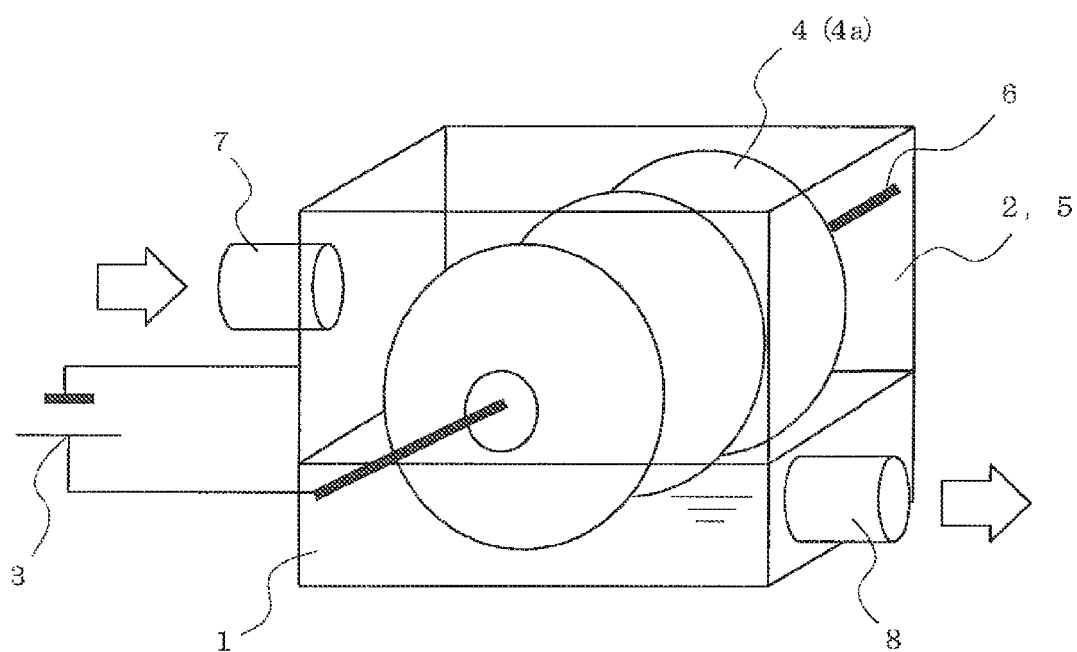
FIG. 5 is a schematic configuration diagram of an active oxygen generating apparatus in Embodiment 3 of the present invention.

Subsequently, Embodiment 3 of the present invention will be described using FIG. 5. FIG. 5 is a schematic configuration diagram of an active oxygen generating apparatus in Embodiment 3 of the present invention. This active oxygen generating apparatus has an inlet 7 and an outlet 8 of the water 1 in the water receiving portion 2. Also, the conductive shaft 6 having its axial direction in the horizontal direction is rotatably arranged above the water receiving portion 2, and a plurality of the plate-shaped (preferably disk-shaped) base materials 4a are arranged on the shaft 6 at intervals so as to form the cathodes 4. These cathodes 4 are installed so that a part of each base material 4a is dipped in the water 1 contained in the water receiving portion 2 similarly to FIG. 4 and are constituted so that the face of each base material 4a dipped in the water 1 is rotated with the rotation of the shaft 6. Also, a part of the bottom face or the side face of the water receiving portion 2 orthogonal to each base material 4a is formed of a conductive material so that the conductive material portion may function as the anode 5.

Here, too, the surface area of the conductive material portion of the water receiving portion 2 functioning as the anode 5 and dipped in the water 1 is set to be equal to or smaller than the surface area of the cathodes 4 dipped in the water 1. Also, the distance between the anode 5 and each base material 4a (cathode 4) is made shorter than the distance between the base materials 4a (cathodes 4).

According to the active oxygen generating apparatus in Embodiment 3, the water 1 flows in through the inlet 7 of the water receiving portion 2, only a certain amount is contained in the water receiving portion 2, electrons are provided to the dissolved oxygen by the conductive polymer contained in the cathode 4 surface, and active oxygen such as superoxide, hydroxyl radical, hydrogen peroxide and the like is generated. By means of the generated active oxygen, the water 1 in the water receiving portion 2 is made antibacterial and hygienic and excess water is discharged through the outlet 8.

Also, since the cathodes 4 reciprocate between the water and the atmosphere alternately, generation efficiency of the active oxygen in the cathodes 4 is improved.

Moreover, since freedom of arrangement of the electrodes (the cathodes 4 and the anode 5) is increased, the apparatus can be made simple and compact.

REFERENCE SIGNS LIST 1 water in which oxygen is dissolved
2 water receiving portion
3 power source
4 cathode
4a plate-shaped base material constituting cathode
5 anode
6 conductive shaft
7 inlet
8 outlet

The invention claimed is:
1. An active oxygen generating apparatus comprising;
cathodes constituted by a plurality of base materials each containing a conductive polymer, an anode having conductivity, a power source that conducts electricity between said cathodes and said anode through water in which oxygen is dissolved, and a water receiving portion that contains said water, wherein
said cathodes are made of a plurality of plate-shaped base materials installed upright at intervals in said water receiving portion; and
said anode is arranged across said plurality of base materials and orthogonally to said plurality of base materials.
2. The active oxygen generating apparatus of claim 1, wherein
the surface area of said anode dipped in the water is set to be substantially equal to or smaller than the surface area of said cathodes dipped in the water.

3. The active oxygen generating apparatus of claim 1, wherein
a distance between said anode and each base material constituting said cathodes is shorter than a distance between said base materials.

4. The active oxygen generating apparatus of claim 1, wherein
said anode is arranged along an inner-side bottom face of said water receiving portion or standing upright in said water receiving portion.

5. The active oxygen generating apparatus of claim 1, wherein
said anode is a box shape or a cylindrical shape covering the entirety of said cathodes.

6. The active oxygen generating apparatus of claim 1, wherein
said anode is constituted by a part of a container containing said water.

7. The active oxygen generating apparatus of claim 1, wherein
said cathodes are arranged side by side on a conductive shaft arranged in the horizontal direction, and rotate so as to be alternately disposed in said water and in the atmosphere around said conductive shaft.

8. The active oxygen generating apparatus of claim 1, wherein
a surface of said base material containing the conductive polymer has a surface resistance value of $10^{-3}$ to $10^5$ $\Omega/cm$.

9. The active oxygen generating apparatus of claim 1, wherein
said conductive polymer is made of at least one of materials of polyaniline, polyaniline derivative, polypyrrole, polythiophene, and polyacetylene.

10. The active oxygen generating apparatus of claim 1, wherein
a distance between said cathodes and said anode is 0.5 to 10 cm.

* * * * *